United States Patent
Basu et al.

(10) Patent No.: US 12,362,346 B2
(45) Date of Patent: Jul. 15, 2025

(54) SOLUTION-PHASE DEPOSITION OF THIN FILMS ON CONVERSION ANODES IN LITHIUM-ION BATTERIES

(71) Applicant: Coreshell Technologies, Inc., San Leandro, CA (US)

(72) Inventors: Sourav Roger Basu, Oakland, CA (US); Jonathan Tan, San Leandro, CA (US)

(73) Assignee: Coreshell Technologies, Incorporated, San Leonardo, CA (US)

( * ) Notice: Subject to any disclaimer, the term of this patent is extended or adjusted under 35 U.S.C. 154(b) by 763 days.

(21) Appl. No.: 17/433,634

(22) PCT Filed: Feb. 25, 2020

(86) PCT No.: PCT/US2020/019717
§ 371 (c)(1),
(2) Date: Aug. 25, 2021

(87) PCT Pub. No.: WO2020/176520
PCT Pub. Date: Sep. 3, 2020

(65) Prior Publication Data
US 2022/0149342 A1   May 12, 2022

Related U.S. Application Data

(60) Provisional application No. 62/810,340, filed on Feb. 25, 2019.

(51) Int. Cl.
*H01M 4/04* (2006.01)
*H01M 4/02* (2006.01)

(52) U.S. Cl.
CPC ....... *H01M 4/0409* (2013.01); *H01M 4/0416* (2013.01); *H01M 2004/021* (2013.01)

(58) Field of Classification Search
CPC ............ H01M 4/0409; H01M 4/0416; H01M 2004/021; H01M 2004/027
See application file for complete search history.

(56) References Cited

U.S. PATENT DOCUMENTS 10,965,360 B2 *   3/2021   Schenk ............... H03M 13/612
2016/0090652 A1   3/2016   Clark
(Continued)

FOREIGN PATENT DOCUMENTS

| CN | 107403910 | 11/2017 |
|---|---|---|
| CN | 108475765 | 8/2018 |

(Continued)

OTHER PUBLICATIONS

"International Application Serial No. PCT/US2020/019717, International Search Report mailed Jul. 22, 2020", 4 pgs.
(Continued)

*Primary Examiner* — Matthew T Martin
*Assistant Examiner* — Bartholomew A Hornsby
(74) *Attorney, Agent, or Firm* — SCHWEGMAN LUNDBERG & WOESSNER, P.A.

(57) ABSTRACT

Methods, systems, and compositions for the solution-phase deposition of thin films that form artificial SEIs on conversion anodes in lithium-ion batteries. In certain aspects, the solution-phase deposition methods comprise sequentially processing a lithium-ion conversion anode with multiple liquid reagents to form a monolayer or stacks of monolayers forming the thin film coating. The conversion anodes produced by the methods and systems described herein have a surface coating that is electrically insulating, consumes little to no lithium, is permeable to lithium transport, is impermeable to electrolyte and is mechanically robust against volumetric expansion.

20 Claims, 3 Drawing Sheets

(56) References Cited

U.S. PATENT DOCUMENTS

| | | |
|---|---|---|
| 2016/0351910 A1 | 12/2016 | Albano et al. |
| 2017/0263935 A1 | 9/2017 | Kozen et al. |
| 2019/0044151 A1 | 2/2019 | Elam et al. |

FOREIGN PATENT DOCUMENTS

| | | | |
|---|---|---|---|
| CN | 114072948 | 2/2022 | |
| WO | WO-2018237083 A1 * | 12/2018 | ............. C23C 18/00 |
| WO | WO-2020176520 A1 | 9/2020 | |

OTHER PUBLICATIONS

"International Application Serial No. PCT/US2020/019717, Written Opinion mailed Jul. 22, 2020", 11 pgs.

"Chinese Application Serial No. 202080031198.3, Response filed Mar. 15, 2024 to Office Action mailed Oct. 31, 2023", W/ English Claims, 37 pgs.

"International Application Serial No. PCT US2020 019717, International Preliminary Report on Patentability mailed Sep. 2, 2021", 13 pages.

"European Application Serial No. 20762472.7, Response Filed May 10, 2022 to Communication Pursuant to Rules 161(2) and 162 EPC mailed Dec. 8, 2021", 20 pages.

"Chinese Application Serial No. 202080031198.3, Office Action mailed Oct. 31, 2023", with Concise Statement of Relevance, 31 pages.

"Chinese Application Serial No. 202080031198.3, Response Filed Aug. 1, 2024 to Office Action mailed Jun. 1, 2024", with English claims, 37 pages.

\* cited by examiner

SOLUTION-PHASE DEPOSITION OF THIN FILMS ON CONVERSION ANODES IN LITHIUM-ION BATTERIES

CROSS-REFERENCE TO RELATED APPLICATIONS

This application is a U.S. National Stage Filing under 35 U.S.C. 371 from International Application No. PCT/US2020/019717, filed on Feb. 25, 2020, and published as WO 2020/176520 on Sep. 3, 2020, which application claims the benefit of U.S. Provisional Application No. 62/810,340, filed on Feb. 25, 2019, which are each incorporated by reference herein, in their entirety, for all purposes.

FIELD

Embodiments of the present disclosure generally relate to various materials, which, when grown on the surface of conversion electrodes, such as lithium-ion battery conversion anodes, via solution-phase deposition techniques, passivate their surfaces against degrading reactions during operation.

BACKGROUND

Lithium-ion batteries (LIBs) are limited in energy density by the theoretical maximum capacity of the constituent materials comprising their anodes and cathodes. Graphite, the most common anode material in state-of-the-art LIBs, is an intercalation electrode wherein Lithium occupies inter-planar gaps between atomic graphene sheets when the battery is charged. Graphite does not undergo a phase change during Lithium intercalation, but rather, remains in the form of stacked planar sheets, albeit with strained inter-planar van der Waals bonds as compared to pre-lithiation. The limited space for lithium ions to reside in these interplanar gaps results in a modest theoretical maximum specific capacity of graphite of ~372 mAh/g. The maximum Li to C atomic ratio observed in intercalated graphite is ~0.17:1. Other materials, such as "alloying" or "conversion" materials, however, possess a substantially higher specific capacity than graphite due to the fact that they undergo a phase change during lithiation that enables restructuring of the lattice into a new crystal structure with substantially higher atomic fraction of lithium. In the case of lithiated Si, for instance, a Li to Si atomic ratio of over 25 times that of fully lithiated graphite has been observed.

However, the accommodation of large atomic fractions of lithium in alloying or conversion materials is typically accompanied by a large volumetric expansion of the host lattice. Alloying materials, which are a subset of conversion materials, include metals or semi-metals such as Si, Ge and Sn which undergo volume changes of 270, 240 and 255% upon lithiation to voltages of 0.05, 0.2 and 0.4V, respectively. Such volumetric expansion can cause stresses that exceed the fracture limit of the host material, resulting in pulverization and subsequent loss of electrical contact to an underlying current collector.

Recent literature has addressed the pulverization of certain conversion and alloying lithium-ion anode materials by reducing their active material particle size to the nanoscale. Numerous references indicate that nanostructured high-capacity conversion and alloying anode materials can withstand large lithiation and de-lithiation strains without fracture. However, despite this advancement, such materials still demonstrate large losses in capacity when coupled with standard state-of-the-art cathodes and cycled as full batteries. Subsequent study of the surface of such nanostructured anode materials post-cycling indicates that the main cause of capacity loss is not due to active particle fracturing, but rather due to an unstable interfacial layer between the active particles and adjacent electrolyte, often termed solid-electrolyte-interphase or "SEI."

Specifically, the large volumetric expansion of conversion anodes during charging leads to three key failure mechanisms: (1) pulverization of conversion anode active material due to internal stresses during charge/discharge cycles, (2) loss of adhesion and electronic conductivity between conversion anode particles and conductive binders or other active material, and (3) consumption of lithium due to a continuously regenerating surface passivation layer (SEI).

SEI is a thin interfacial layer that forms on the surface of all lithium-ion battery anodes when the potential of the electrode is below the reductive stability limit of an adjacent electrolyte versus sonic reference potential. For example, in a system comprising a graphite anode with an adjacent cyclic carbonate electrolyte (such as ethylene carbonate), SEI begins to form when the electrode potential is less than ~1V vs. $Li^+/Li^0$. The growth of SEI in this instance results from a reduction of the electrolyte molecule (ring opening in the case of ethylene carbonate), resulting in an ionized species that then combines with available lithium ions to precipitate a solid insoluble Lithium-organic compound on the surface of the anode. The growth of this material is eventually self-limiting, as the molecules comprising the SEI tend to be electrically insulating, and as such, block the electron transfer from electrolyte to electrode that is required for continuous electrolyte reduction. In the case of state-of-the-art LIES constructed with graphite anodes, for instance, the formation of this self-limiting SEI is crucial to the cyclability of the battery. A non-self-terminating SEI would inevitably consume all available Lithium and severely limit cycle lifetime of the battery.

In the case of graphite anodes, volumetric expansion of the host lattice is only ~10% at near full charge. Any SEI that is present on the surface of the graphite anode is therefore also only required to undergo a commensurately small tangential strain during this expansion. For alloying materials such as Si, Ge or Sn, however, a >200% volumetric expansion results in a tangential strain beyond the fracture limit of these materials' respective SEI layers. Similar volumetric expansion and unstable SEI is observed in other conversion materials such as $SnO_2$. A highly active area of research, as a result, is the addition of novel molecules to the electrolyte to form a more resilient SEI on the surface of alloying or conversion anode materials. However, to date, no electrolyte additives have been known to successfully enable a cycle lifetime of a conversion or alloying anode material that approaches that of state-of-the-art graphite.

Recent literature has demonstrated the use of oxides such as $Al_2O_3$ grown by atomic layer deposition (ALD) as an SEI replacement (also known as "artificial SEI") in both graphite and conversion anodes. ALD may be performed on anode powders prior to electrode formation or after electrode formation. Unfortunately, the necessarily high electrical resistivity of an oxide artificial SEI, when applied directly to anode powders, creates a substantial internal resistance that prevents normal battery operation. Consequently, artificial SEI's are best applied on fully formed electrodes, ideally using a deposition process that can be integrated into a typical roll-to-roll LIB manufacturing process.

However, roll-to-roll ALD has yet to be demonstrated as a commercially viable process. Requirements of high deposition zone vacuum, high source and substrate temperature to prevent precursor condensation, and limited selection of precursors for the deposition of organic and mixed organic-inorganic materials renders roll-to-roll ALD impractical for implementation in high-volume, state-of-the-art LIB manufacturing. Consequently, a need exists to apply an artificial SEI to the surface of alloying and conversion anodes using a technique that can be more feasibly introduced into a LIB manufacturing process as compared to roll-to-roll ALD.

SUMMARY

In an aspect, systems and methods of the disclosure describe solution-phase techniques for the deposition of novel materials (in the form of an artificial SEI) on the surface of alloying and conversion electrodes, such as anodes. The methods disclosed herein are more commercially and technically feasible for introduction into high-volume lithium-ion battery (LIB) manufacturing than roll-to-roll ALD or other high-vacuum, vapor deposition processes.

Nanoscale particles of alloying and conversion anode materials are often synthesized to be roughly spherical in nature, as this minimizes surface area to volume ratio, thereby maximizing capacity while minimizing losses from continuous SEI failure during cycling. If a rough upper limit of 300%, for example, is set for the volumetric expansion of a spherical particle of a particular conversion or alloying material during lithiation, the corresponding surface area expansion would be roughly twice of the original. The mechanical strain experienced by any intentionally deposited "artificial SEI" on the surface of such a particle as a result of the aforementioned expansion would then be roughly 100%. When considering the elongation at break of various classes of candidate materials, few purely inorganic materials exceed 100%.

As a result, this disclosure also focuses on the use of flexible organic or mixed organic-inorganic materials that possess low elastic modulus, low hardness and high elongation at break as coatings on electrodes fabricated from conversion or alloying materials. Furthermore, the present disclosure describes the generation of highly-energy-dense LIBs composed from anodes containing conversion materials, while also meeting industry-standard cycle lifetime requirements, by solving problems associated with SEI formation.

High quality, conformal thin films of inorganic materials have been deposited for decades by solution-phase techniques, such as chemical bath deposition (CBD), successive-ionic layer adsorption and reaction (SILAR) and layer-by-layer sol-gel. In the CBD technique, (typically) aqueous solutions of complexed metal precursors are mixed with chalcogenide or oxide ion sources. CBD is best known for being used for depositing high quality CdS or ZnS as the n-type junction partner on CdTe or CIGS thin film solar cells. This technique has been used for years to set world record efficiencies for these types of solar cells. They have yielded high open-circuit voltages, high diode ideality and high shunt resistance, indicating excellent film quality and conformality. CBD processes have also been commercialized into high-volume thin film solar cell production lines.

A useful variation of the CBD technique is SILAR. In this instance, substrates are alternately exposed to cationic and anionic reactant solutions, with rinse steps in between. While this technique results in slower film growth, a benefit of the technique is the elimination of homogenous nucleation (Precipitation) from intermixing of the two reactants, which dramatically improves materials utilization. Considering the fact that the tunneling limit of a good dielectric is on the order of 1-2 nm, SILAR techniques are feasible for deposition of passivation layers on battery electrode surfaces. Thickness control in SILAR processes is also better than in CBD processes; thickness control of a passivation layer on battery electrodes, for instance, is critical to prevent unwanted barriers to lithium diffusion while maintaining an electron tunneling barrier.

Solution-based techniques also exist that demonstrate layer by layer sol-gel coating using the same kinds of metal organics used in vapor phase ALD. For instance, an $Al_2O_3$ monolayer can be grown by immersion of a substrate in a solution of aluminum tri-sec butoxide. The adsorption of the metalorganic precursor, followed by an oxidizing step such as hydrolysis, can yield one monolayer of oxide. These steps are repeated with rinse steps in between to yield monolayer-by-monolayer coatings. The metal alkoxide precursors are typically soluble to very high molarities in standard organic solvents like 2-propanol.

In recent years, high quality $Al_2O_3$, $SiO_2$ and $ZrO_2$ recombination blocking layers were all grown on $TiO_2$ dye-sensitized solar cells using this technique. As an example, ALD $Al_2O_3$ has recently been investigated as an artificial SEI on the conversion anode material silicon. The conversion of $Al_2O_3$ to a glassy electrolyte, $LiAlO_2$, in the first few cycles results in a lithium-permeable surface layer that is still electrically resistive. However, oxides—just as with typical SEI—possess high elastic moduli and low tensile strain limits. Such materials may therefore also be subject to the same sort of brittle failure observed in the SEI of bare Si—. Finally, by completely encapsulating particles in an insulating layer, electrical pathways between particles are effectively blocked, resulting in a large increase in internal resistance. The resistance added by encapsulants on Si powders may be useful for preventing SEI formation, but they prevent high-rate charging and high peak discharge. In contrast, the technique of the present disclosure represents a high-throughput, low-cost, vacuum-free alternative to ALD that can be performed on formed electrodes instead of particles, employing candidate coating materials that are mechanically flexible.

A variation of vapor-phase ALD is vapor-phase molecular layer deposition (MLD). In vapor-phase MLD, molecular precursors with particular terminating groups react with functionalized surfaces in a self-limiting manner akin to ALD. However, instead of leaving behind an attached moiety that is only one atomic monolayer thick, MLD reactions can be used to deposit monolayers composed of substantially larger molecules. As an example, in the MLD growth of "Alucone", TMA is used as a metalorganic precursor that provides atomic monolayers of Al. Ethylene glycol is then used as an oxidizing agent (in contrast to water or oxygen plasma in ALD of $Al_2O_3$) and provides a 2-unit carbon chain attached to each deposited Al atom. Alternating deposition cycles of TMA and ethylene glycol (separated by purge steps) then provide a mixed-organic material—"alucone", that is substantially less dense than the corresponding oxide ($Al_2O_3$) grown by ALD and resembles other "metalcones" such as silicone. Alucone is an example of mixed organic-inorganic materials that can be deposited by MLD; organic polymers such as polyamide, for instance, are also theoretically capable of being deposited by MLD. Such materials are also known to be more mechanically flexible than the purely inorganic materials typically grown by ALD, and therefore may serve as better candidates for an artificial SEI on the conversion anodes produced by the methods and systems as described herein.

As with ALD, a solution-phase analogue to vapor-phase MLD also exists. By exposing substrates to alternating solutions of MLD precursors (as opposed to vapors), a similar layer-by-layer growth can be achieved as in SILAR or layer-by-layer sol-gel. The technique also yields the benefit of being high-throughput, low-cost and vacuum-free. Additionally, numerous organic materials exist whose growth would be impractical via vapor-phase MLD (due to difficult vaporization of precursors, for instance), but which could be easily grown via solution-phase MLD.

While the vast majority of MLD has been performed using vapor-phase deposition techniques there are notable exceptions such as the solution-phase demonstration of MLD of a polyamide from dissolved precursors. In this example, aromatic polyamide is deposited in a layer-by-layer fashion analogous to MLD through sequential exposures of a substrate to solutions of a heterobifunctional reagent.

In a separate vapor-phase example, the growth of an alucone from TMA and the homobifunctional reagent BDO (butanediol) fails to achieve linear growth because both functional groups on a single BDO molecule react simultaneously with an Al terminated surface ("double reaction"), thereby rendering the surface inactive for further reaction.

Numerous other materials also fail to achieve linear growth in vapor-phase MLD for the same reason. However, in liquid-phase, various chemistries may be employed that prevent reaction at both ends of a bifunctional reagent. Using this method, controlled layer-by-layer growth of a polymer has been performed on flat substrates such as $SiO_2$/Si wafers and porous substrates such as nanoporous alumina.

Conformal growth on nanoporous alumina has been proven through cross-section microscopy. Elemental analysis of the surface layer indicates penetration of the coating throughout the substrate's porous nanostructure.

These results clearly demonstrate that a solution-phase process is capable of conformally coating a nanoporous substrate composed of high aspect-ratio features, with residence times for precursors in the range of reasonable, scalable processes (1 to 10 seconds). The physical similarity between a nanoporous alumina substrate and a porous LIB electrode in this context is quite evident and lends confidence in the technique to be able to conformally coat an artificial SEI on the surface of a Si-containing anode.

Beyond the unique protection/deprotection chemistry that can be added to the MLD process, the other key benefit of the liquid-phase process is the ability to employ precursors whose vapor pressure at reasonable temperatures would otherwise be too low for a vapor-phase MLD process. For example, more complex sugar alcohols (such as erythritol) could be used to generate novel alucones in a facile manner. In the same vein, longer/larger organic monomers whose intermolecular Van der Waals forces prevent vaporization can also be dissolved in an appropriate solvent and utilized. The use of such larger monomeric units or appropriately-terminated oligomers could greatly enhance the deposition coating rate. For example, in the context of deposition of an artificial SEI on LIB electrodes, a 5 nm thick alucone film, which is deposited typically through 10's of cycles in the case of vapor-phase MLD, may be deposited in only a few cycles through the employment of larger monomers or prepolymers in liquid-phase MLD.

However, until now, solution-phase techniques have not been developed to conformally coat the surfaces of alloying or conversion lithium-ion anode materials with organic, inorganic or mixed organic-inorganic materials. By utilizing a variety of solution-phase deposition techniques, such as CBD, SILAR, layer-by-layer sol-gel, or solution a wide array of candidate materials can be deposited on the surface of alloying or conversion lithium-ion anodes in a cost-effective and scalable manner. Specific materials can then be chosen to yield an artificial SD that protects the associated lithium-ion battery from the deleterious reactions outlined in previous sections.

An important advantage of solution-phase deposition over vapor-phase is that numerous techniques exist to scale solution-phase deposition to high-volume production. All LIB manufacturing currently employs the use of roll-to-roll (R2R) production equipment to generate long rolls of electrode that are eventually slit and packaged into cylinders or pouches. As such, any technique that introduces a coating process into LIB manufacturing must also be able to process entire rolls of electrode at once. Fortunately, R2R wet coating techniques have already been scaled to high-volume production across numerous industries. For example, these techniques have been commercialized to the order of millions of square meters per year in the OLED, thin-film solar and membrane industries. LIB anodes and cathodes are themselves coated using a wet process, namely the slot-die casting of slurries directly onto foil web substrates. R2R solution deposition has yielded thin films ranging in thickness from single digit nm to 100's of microns, on a variety of substrate types and morphologies, and with a high degree of uniformity.

On a manufacturing scale, R2R solution deposition offers four key advantages over vapor-phased counterparts: (1) unlike vapor-phase, which often requires high substrate temperatures to prevent precursor condensation, solution-phase processes are typically performed at temperatures <100 C—well within the upper temperature processing limits of LIB electrodes, (2) commercialized R2R solution deposition processes can run at line-speeds, commensurate with the production rate of lithium-ion electrodes, (3) solution-phase deposition processes eliminate costly capital equipment associated with high-vacuum vapor-phase processes, and (4) low required precursor concentrations for surface saturation (~1-10 mM), combined with near 100% materials' utilization rates imply that the cost of reagents in solution-phase is substantially lower than in vapor-phase. For these reasons, unlike R2R solution deposition, no R2R vapor-phase ALD or MLD process has been successfully commercialized to high-volume production to date.

Additionally, the introduction of a more stable and robust artificial SEI layer reduces lithium-metal dendrite formation during high-rate charging. Dendrites are known to be a common cause of fires in LIBs. The coatings described herein would not only stabilize the cycling capacity of conversion anodes but could also form a more uniform physical barrier as compared to state-of-the-art SEI, where local imperfections are believed to be the starting point of most dendrites. In order to achieve a typical charging goal of 80% state-of-charge in 15 minutes without compromising safety, a robust electrode coating is essential. Therefore, methods of the present disclosure, which make essential contributions to LIB cost reduction and potentially improved safety, will greatly promote customer acceptance of LIB end-use applications such as electric vehicles.

Electrode binders (whether electrically conductive or insulating), while covering a substantial portion of the active material surface, cannot themselves act as an artificial SEI, because they either cannot block the electron transfer associated with the reduction of electrolyte that leads to SEI growth in the first place (as is the case with conductive binders), or they do not conformally cover an electrode surface (allowing electrolyte to diffuse through or around the binder to reach the electrode surface—the case with both insulating and conductive binders). Examples of electrically conductive binders include but are not limited to poly (dioctylfluorene-co-fluorenone-co-methylbenzoic ester) (PFM) and poly(1-pyrenemethyl methacrylate) (PPy). Examples of electrically insulating binders include but are not limited to poly (vinylidene fluoride) (PVDF), carboxymethylcellulose (CMC) and styrene butadiene rubber (SBR)

Binder materials, therefore, do not satisfy the need for an artificial SEI in conversion anode systems. In all conversion anodes, failure due to SEI formation, either during the first cycle or during repeated cycling, is essentially unavoidable unless an improved SEI can be engineered that not only withstands volumetric expansion of the underlying active material but which also does not consume substantial amounts of lithium in its own formation. In addition, such a material must be impermeable to electrolyte, permeable to Lithium, highly electrically resistive and deposited by cheap, rapid and scalable R2R processes.

The present disclosure provides, in certain aspects, a liquid phase deposition method for generating an artificial solid-electrolyte interphase (SEI) on a surface of a fully-formed lithium-ion battery anode composed of at least a conversion material, comprising: (a) transferring, by a conveyance apparatus, the fully-formed lithium-ion battery anode to a first reaction chamber containing a first liquid solution comprising at least a first reagent; (b) exposing, by the conveyance apparatus, the fully-formed lithium-ion battery anode to the first liquid solution in the first reaction chamber to yield a partially coated layer of the artificial SEI with the at least first reagent chemically bonded onto the surface of the lithium-ion battery anode; (c) rinsing, in the first reaction chamber, the partially-coated layer of the artificial SEI with a first rinsing solution comprising a first solvent to remove unreacted first reagent; (d) transferring, by the conveyance apparatus, the fully-formed lithium-ion battery anode from (d) to a second reaction chamber containing a second liquid solution comprising at least a second reagent; (e) exposing, by the conveyance apparatus, the fully-formed lithium-ion battery anode to the second liquid solution in the second reaction chamber, wherein the at least second reagent reacts with the at least first reagent chemically bonded onto the surface of the fully-formed lithium-ion battery anode to produce the artificial SEI comprising a monolayer on the surface of the lithium-ion battery anode, the monolayer comprising a compound generated from the reaction of the at least second reagent and the first reagent; and (f) rinsing, in the second reaction chamber, the artificial SEI with a second rinsing solution comprising a second solvent to remove unreacted second reagent.

In certain aspects, the present disclosure relates to a liquid phase deposition method for generating a thin film artificial SEI coating on a surface of a lithium-ion battery anode composed of at least a conversion material, comprising: (a) providing the lithium-ion battery anode onto a conveyance apparatus; (b) transferring, by the conveyance apparatus, the lithium-ion battery anode to a first reaction chamber containing a first liquid solution comprising at least a first reagent; (c) exposing, by the conveyance apparatus, the lithium-ion battery anode to the first liquid solution in the first reaction chamber to yield a layer partially coated with the at least first reagent chemically bonded onto the surface of the lithium-ion battery anode; (d) rinsing, in the first reaction chamber, the layer with a first rinsing solution comprising a first solvent to remove unreacted first reagent; (e) transferring, by the conveyance apparatus, the lithium-ion battery anode from (d) to a second reaction chamber containing a second liquid solution comprising at least a second reagent; (f) exposing, by the conveyance apparatus, the lithium-ion battery anode to the second liquid solution in the second reaction chamber, wherein the at least second reagent reacts with the at least first reagent chemically bonded onto the surface of the lithium-ion battery electrode to produce the thin film coating comprising a monolayer on the surface of the lithium-ion battery anode, the monolayer comprising a compound generated from the reaction of the at least second reagent and the first reagent; and (g) rinsing, in the second reaction chamber, the coating with a second rinsing solution comprising a second solvent to remove unreacted second reagent.

In certain aspects, the present disclosure relates to a system for coating a thin film artificial SEI comprising a metalcone onto the surface of a lithium-ion battery anode composed of at least a conversion material, comprising a conveyance apparatus for conveying the anode to (and from): (a) a first reaction chamber where the anode is exposed to a first liquid solution comprising at least a first reagent comprising a meta organic to produce a layer comprising an adsorbed first reagent on the anode; and (b) a second reaction chamber where the anode having a layer comprising an adsorbed first reagent is exposed to a second liquid solution comprising at least a second reagent comprising an organic molecule, wherein the at least second reagent reacts with the first adsorbed reagent to produce the thin film on the surface of the electrode.

In certain aspects, the present disclosure relates to a system for coating a thin film artificial SEI comprising an organic material onto the surface of a lithium-ion battery anode composed of at least a conversion material, comprising a conveyance apparatus for conveying the anode to (and from): (a) a first reaction chamber where the anode is exposed to a first liquid solution comprising at least a first reagent comprising a first organic molecule to produce a layer comprising an adsorbed first reagent on the anode; and (b) a second reaction chamber where the anode having a layer comprising an adsorbed first reagent is exposed to a second liquid solution comprising at least a second reagent comprising an second organic molecule that is chemically distinct from the first organic molecule, wherein the at least second reagent reacts with the first adsorbed reagent to produce the thin film on the surface of the electrode.

In certain aspects, the present disclosure relates to a system for coating a thin film artificial SEI comprising a metalcone onto the surface of a lithium-ion battery anode composed at least of a conversion material, comprising a conveyance apparatus for conveying the anode to (and from) a reaction chamber where: (a) the anode is exposed to a first liquid solution comprising at least a first reagent comprising a metal organic to produce a layer comprising an adsorbed first reagent on the anode; and (b) the anode having a layer comprising an adsorbed first reagent is exposed to a second liquid solution comprising at least a second reagent comprising an organic molecule, wherein the at least second reagent reacts with the first adsorbed reagent to produce an anode comprising a monolayer of thin film coated onto the surface of the anode, the monolayer of thin film comprising a metalcone generated from the reaction of the metalorganic and the organic molecule.

In certain aspects, the present disclosure relates to a system for coating a thin film artificial SEI comprising an organic material onto the surface of a lithium-ion battery anode composed at least of a conversion material, comprising a conveyance apparatus for conveying the anode to (and from) a reaction chamber where: (a) the anode is exposed to a first liquid solution comprising at least a first organic reagent to produce a layer comprising an adsorbed first reagent on the anode; and (b) the anode having a layer comprising an adsorbed first reagent is exposed to a second liquid solution comprising at least a second organic reagent, wherein the at least second organic reagent reacts with the first adsorbed reagent to produce an anode comprising a monolayer of thin film coated onto the surface of the anode, the monolayer of thin film comprising the organic material generated from the reaction of the first and second reagents.

In certain aspects, the present disclosure relates to a liquid phase deposition method for coating a thin film artificial SEI comprising a metalcone onto a surface of a lithium-ion battery anode composed of at least a conversion material, comprising: (a) providing the anode into a reaction chamber; (b) exposing the anode to a first liquid solution comprising a first reagent comprising a metalorganic to produce a layer comprising an adsorbed first reagent on the surface of the anode; and (c) exposing the anode with the absorbed first reagent to a second liquid solution comprising a second reagent comprising an organic molecule, wherein the at least second reagent reacts with the first adsorbed reagent to produce a monolayer of thin film coated onto the surface of the anode, the monolayer of thin film comprising the metalcone generated from the reaction of the metalorganic and the organic molecule.

In certain aspects, the present disclosure relates to a liquid phase deposition method for coating a thin film artificial SEI comprising an organic material onto a surface of a lithium-ion battery anode composed of at least a conversion material, comprising: (a) providing the anode into a reaction chamber; (b) exposing the anode to a first liquid solution comprising a first organic reagent to produce a layer comprising an adsorbed first reagent on the surface of the anode; and (c) exposing the anode with the absorbed first reagent to a second liquid solution comprising a second organic reagent, wherein the at least second organic reagent reacts with the first adsorbed reagent to produce a monolayer of thin film coated onto the surface of the anode, the monolayer of thin film comprising the organic material generated from the reaction of the first and second reagents.

In certain aspects, the present disclosure relates to a lithium-ion battery anode comprising a conversion material, comprising a porous microstructure coated with a monolayer or monolayers of a thin film artificial SEI coating, wherein the thin film artificial SEI coating comprises a metalcone or an organic material, wherein the thin film artificial SEI coating is produced by the liquid phase deposition methods described herein. In certain aspects, the present invention relates to a lithium-ion battery comprising an anode composed of a conversion material coated with a thin film artificial SEI comprising a metalcone or an organic material, wherein the thin film is produced by the liquid phase deposition methods described herein.

In some embodiments, the method steps provided herein are repeated to yield consecutive growth of multiple stacked monolayers, thereby yielding an artificial SEI having an overall thickness between 0.5 nanometers (nm) and 100 micrometers (μm). In some embodiments, the fully-formed lithium-ion battery anode has a thickness of 100 nm to 1,000 μm. In some embodiments, the fully-formed lithium-ion battery anode has pores ranging in size of 0.1 nm to 100 μm. In some embodiments, the fully-formed lithium-ion battery anode has a film porosity of 1-99%.

In some embodiments, the conversion material comprises Si, Sn, Ge, Al, P, Zn, Ga, As, Cd, In, Sb, Pb, Bi, SiO, $SnO_2$, or any combinations of these. In some embodiments, the monolayer or stacked monolayers is composed of at least one or more metalcones. In some embodiments, the one or more metalcones is generated by a reaction between a first reagent comprising a metalorganic and a second reagent comprising an organic molecule. In some embodiments, the first reagent is a metalorganic comprising an organic moiety and a metal comprising Al, Zn, Ti, Zr, Mn, and/or V, and the second reagent is an organic molecule comprising ethylene glycol, glycerol, erythritol, xylitol, sorbitol, mannitol, butanediol, pentanediol, hydroquinone, hexanediol, lactic acid, triethanolamine, p-phenylenediamine, glycidol, caprolactone, fumaric acid, aminophenol, and/or diamino diphenyl ether. In some embodiments, the artificial SEI generated from the monolayer or stacked monolayers is composed of one or more organic material(s). In some embodiments, the organic material(s) is a polymer comprising a polyamide, polyimide, polyurea, polyazomethine, a fluoroelastomer, or any combination of these.

In some embodiments, the conveyance apparatus comprises a series of rollers for transferring the fully-formed lithium-ion battery to the first or second reaction chamber. In some embodiments, the fully-formed lithium-ion battery anode is exposed to the first and second liquid solutions by submerging, spraying, slot die coating, bath coating, or gravure roller coating. In some embodiments, the fully-formed lithium-ion battery anode comprises an active material, wherein the active material is exposed to the first and second liquid solutions by spraying, slot die coating, bath coating, or gravure roller coating.

In some embodiments, the methods described herein further comprise passing a first residual solution comprising the first solvent and unreacted first reagent to a first filtration step to separate unreacted first reagent from the first solvent; and passing a second residual solution comprising the second solvent and unreacted second reagent to a second filtration step to separate the unreacted second reagent from the second solvent. In some embodiments, the methods further comprise recycling recovered unreacted first or second reagent back to the first or second liquid solutions, respectively; and recycling recovered first or second solvent back to the first or second rinsing solutions, respectively. In some embodiments, the first and second filtration steps are carried out using membrane separation, chemical precipitation, ion-exchange, electrochemical removal, physical adsorption, flow filtration chromatography, or any combination of these.

In some embodiments, the first and second liquid solutions comprise more than one reagent. In some embodiments, the artificial SEI is composed of grains having a size ranging from 0.5 nm to 100 μm in length. In some embodiments, the artificial SEI is crystalline. In some embodiments, the artificial SEI is amorphous, In some embodiments, the artificial SEI possesses an elastic modulus between 0.1 GPa and 100 GPa. In some embodiments, the artificial SEI possesses a bulk elongation at break between 1% and 500%.

In some embodiments, the organic molecule in the second reagent possesses a molecular weight between 10 and 10,000 Daltons.

In some embodiments, the lithium-ion battery anode comprises an active material deposited on a substrate. In some embodiments, the active material in the lithium-ion battery anode is a conversion anode material comprising Si, Sn, Ge, Al, P, Zn, Ga, As, Cd, In, Sb, Pb, Bi, SiO, SnO$_2$, or any combinations of these. In some embodiments, the substrate is made of a metal such as copper, aluminum or stainless steel.

DETAILED DESCRIPTION

The present disclosure provides solution-phase deposition methods and systems for forming and applying "artificial" SEI (thin film) layers to the surfaces of conversion anodes in batteries, for example anodes in lithium-ion batteries. The present methods and systems produce an artificial SEI that is superior to what is typically grown electrochemically. Such coatings (or nanolayers) produced by the methods and systems described herein may be flexible and mechanically robust (so as to endure the volumetric expansion that typically occurs during lithiation of such anodes), electrically insulating (so as to prevent electron transfer associated with reduction of electrolyte molecules adjacent to such electrodes), lithium-permeable (so as not to impede the transfer of lithium ions between such anodes to any associated cathode and vice-versa), and sufficiently dense so as to prevent diffusion of electrolyte molecules through the artificial SEI to the electrode surface (which would altogether negate the effect of the artificial SEI).

As described herein, the term "conversion" refers to materials that undergo change in crystal structure upon insertion of lithium, which is accompanied by the breaking and reforming of chemical bonds on the host material matrix. In some cases, a subset of conversion materials may be referred to as "alloying" materials. Alloying materials are those where lithium forms a solid-solution or a mixture of phases with a metallic or semi-metallic host matrix upon insertion.

The method refers generally to a solution-phase (also described as "liquid-phase") coating process for the deposition of thin films that form an artificial SEI on the surface of conversion anode materials. Such coated anodes may then be paired with appropriate cathodes to generate full lithium-ion batteries with improved performance and energy density.

Figure 3:
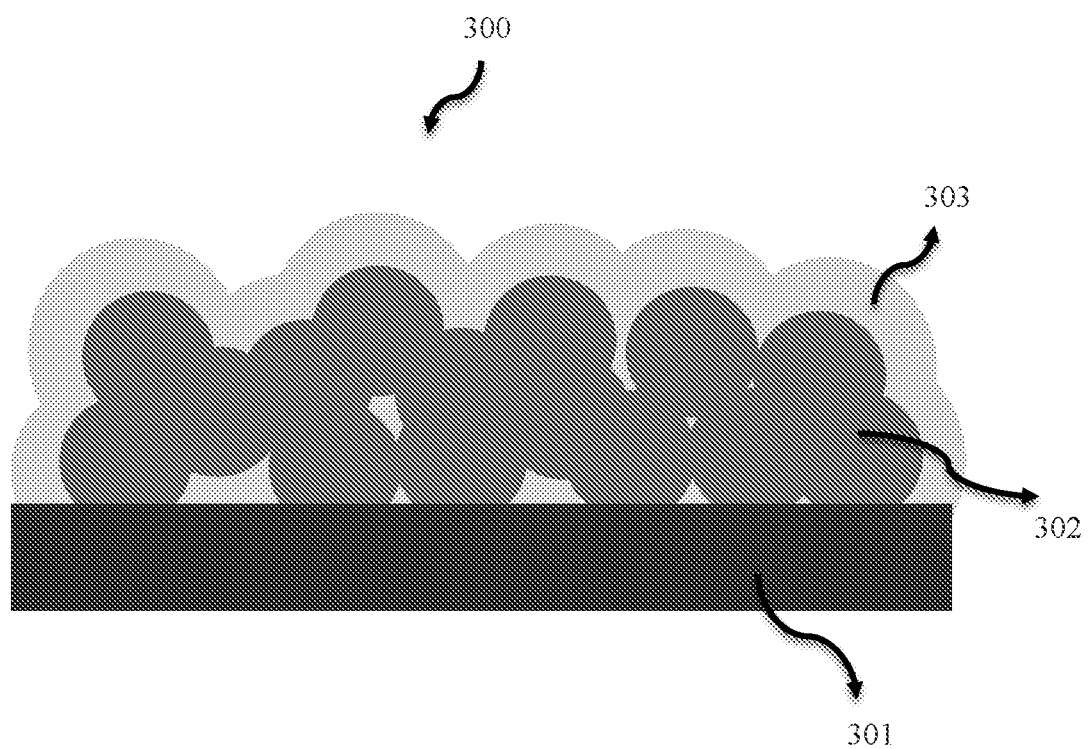
FIG. 3 is an illustration of a lithium-ion battery anode coated with a thin film in accordance with the present disclosure on top of a foil substrate.

An example of an embodiment of a coated battery anode in accordance with the present disclosure is shown in FIG. 3. A coated battery conversion anode, 300, comprises bound anode constituent active material particles, 302, that are coated with a thin film, 303. The thin film, 303, may be between 0.5 nm to 100 μm thick. The anode constituent particles, 301, are situated on top of a foil substrate, 301.

The electrodes as described herein are fully-formed (also referred interchangeably herein as "pre-formed"). Full-forming an electrode refers to a standard sequence of electrode forming processes, including but not limited to, casting of slurries of active and inactive material components onto a foil substrate to form an electrode, followed by drying of the electrode, followed by calendaring of the electrode. In some embodiments, full-forming of an electrode does not include calendaring.

An electrode typically comprises a porous coating of an "active material" on top of a substrate, such as a foil or a sheet. Active materials denote the specific materials within a lithium-ion battery electrode that accept insertion and de-insertion of lithium during charging and discharging. In some embodiments, the battery electrode is an anode that may be composed of an active material that is a conversion material. The conversion anode material may be composed of elements or compounds including, but not limited to, Si, Sn, Ge, Al, P, Zn, Ga, As, Cd, In, Sb, Pb, Bi, SiO, or SnO$_2$.

In certain embodiments, the substrate may be a continuous substrate, typically in the form of a foil or sheet. A "continuous substrate" as used herein refers to a substrate that possesses an aspect ratio of at least 10:1 between its two largest dimensions, and is sufficiently flexible so as to be wound onto itself in the form of a roll. It may be made up of various materials, including but not limited to metal, such as copper, aluminum, or stainless steel, or an organic material, such as polyimide, polyethylene, polyether ether ketone (PEEK), or polyester, polyethylene napthalate (PEN).

In certain aspects, the methods and systems provided herein relate to generating an artificial SEI layer in batteries that is more resistant to dissolution than current SEIs, has sufficient adhesion to the material or component to be coated with adequate mechanical stability, is reasonably electrically resistive to prevent electrolyte breakdown while being conductive of ions (as in the case of batteries, for example lithium ions), and is substantially devoid of any particle-to-particle internal resistance.

Figure 1:
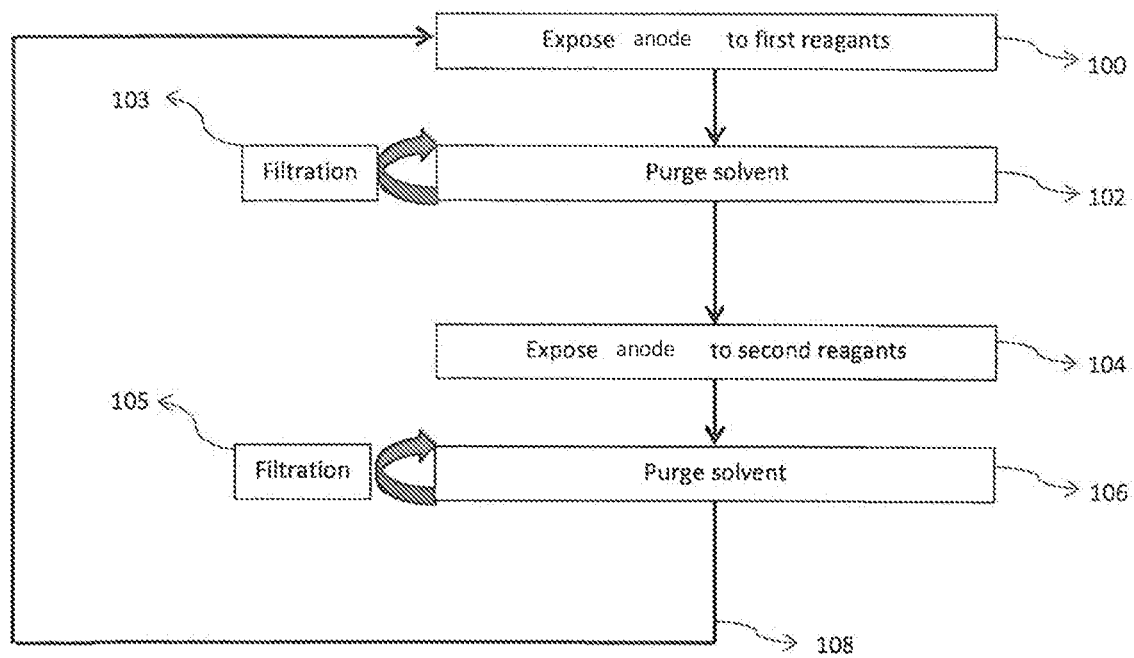
FIG. 1 is a general flow scheme for an embodiment of the method in accordance with the disclosure. The method includes rinsing/purge steps as well as filtration steps.

A simple flow scheme for an embodiment of the method in accordance with the disclosure is shown in FIG. 1. While the embodiment of FIG. 1 is related to a method for coating a thin film that forms an artificial SEI onto the surface of a conversion anode, this description is only representative of a component to be deposited using the methods and systems provided herein and is not to be construed as being limited in any way.

Referring to FIG. 1, a conversion anode, for example, may be exposed, in 100, to a first liquid solution comprising a first reagent(s) in a first reaction chamber to produce a layer comprising an adsorbed first reagent(s) on the surface of the anode.

The first liquid solution comprises at least a first reagent. The first reagent may be any compound that is able to react with the material of the anode (i.e., the component to be coated) to form a self-limiting layer. In certain embodiments, the first reagent is a metalorganic compound. Examples of such metalorganics include, but are not limited to, aluminum tri-sec butoxide, titanium ethoxide, niobium ethoxide, trimethyl aluminum, and zirconium tert-butoxide. In another embodiment, the first reagent comprises an aqueous solution comprising an ionic compound. Examples include, but are not limited to, zinc acetate, cadmium chloride, zinc chloride, zirconium chloride, and zinc sulfate. In some embodiments, the first solution may vary in pH. In some embodiments, the first liquid solution may be a solution including ionic compounds of both cationic and anionic precursors that react to form a solid film; in this case the film growth is limited by the kinetics of the film-forming reaction. In some embodiments the first liquid solution may contain complexing agents that restrict the kinetics of the film-forming reaction. In some embodiments, the first liquid solution may be a solution including both metalorganic and oxidizing precursors that react to form a solid film; in this case the film growth is limited by the kinetics of the film-forming reaction.

In the embodiments where the first reagent is a metalorganic, the first liquid solution may also comprise a solvent that is used to dissolve or complex the first reagent. Preferred solvents include organic solvents, such as an alcohol, for example, isopropyl alcohol or ethanol, alcohol derivatives such as 2-methoxyethanol, slightly less polar organic solvents such as pyridine or tetrahydrofuran (THF), or nonpolar organic solvents such as hexane and toluene.

In one embodiment, the first liquid solution is contained within a first reaction chamber. The reaction chamber must be a device large enough to accommodate receiving the electrode and to contain the amount of liquid solution to be used in the self-limiting layer producing reaction. Such devices that may be used as the reaction chamber include, but are not limited to, tanks, baths, trays, beakers, or the like.

The anode may be transferred to the first reaction chamber by a conveying apparatus. The conveying apparatus, as described in more detail below, may be adapted and positioned in such a way as to guide or direct the anode into and/or out of the first chamber.

In certain embodiments, the anode may be submerged, either fully or partially, into the first and second liquid solutions of the first and second reaction chambers, respectively. In other embodiments, the anode may be sprayed with the first and second liquid solutions in first and second reaction chambers, respectively.

In another embodiment, the anode may be conveyed underneath a slot die coater, from which the first liquid solution is continuously dispensed to generate a liquid film over a designated area of the anode. The speed at which the anode is conveyed and the flow rate of fluid through the die determines the thickness of the liquid film. The solvent may then simply evaporate to create a solid film of the dissolved components, or the liquid film may possess reactants that react to precipitate a thin film on the surface of the anode. The resulting solid film may be as thin as one atomic monolayer or as thick as 100 microns. The reaction may occur while the solvent is still present or after the solvent has evaporated. If residual solvent or solution remains until after the end of the coating process, it may be removed by various techniques, such as a doctor blade, air knife, metering knife or similar. The entire slot die coating process may then be repeated to generate new films of different chemical composition or to simply generate thicker coatings of the same chemical composition. In this case, the reaction chambers simply comprise the area where the slot-die coater is located, and do not necessarily resemble an enclosed space as is suggested by the term "chamber."

In another embodiment, the anode may be conveyed through a tank containing a coating solution and a gravure roller. In this embodiment, the gravure roller continuously transfers fluid from the dip tank to the adjacent web due to preferential surface tension (wetting) of the web and the roller by the coating solution. As in slot-die coating, the result is initially a liquid film on the surface of the anode. Particular solution, web and roller compositions, for example, can influence the surface tension of the fluid on both the web and the roller, thereby influencing the coating efficiency of the process. The solvent may then simply evaporate to create a solid film of the dissolved components, or the liquid film may possess reactants that react to precipitate a thin film on the surface of the anode. The resulting solid film may be as thin as one atomic monolayer or as thick as 100 microns. The reaction may occur while the solvent is still present or after the solvent has evaporated. If residual solvent remains until after the end of the coating process, it may be removed by various techniques, such as a doctor blade, air knife, metering knife or similar. The entire gravure coating process may then be repeated to generate new films of different chemical composition or to simply generate thicker coatings of the same chemical composition.

Multiple sequential, repeated steps of the same process (i.e., slot-die or gravure coating) can be performed with the same or different solutions. Solutions may be separated (as in first solution, second solution, etc.) to avoid cross-contamination, for instance, or to prevent homogenous nucleation when a heterogeneous film-forming reaction is preferred.

The conversion anode is exposed to the first liquid solution for a sufficient time (a "residence time") so as to allow the first reagent(s) to adsorb onto the anode surface and generate a continuous layer (i.e. self-limiting layer). Examples of process variables that may influence this step include solution and anode temperature, residence time and reagent concentration.

An advantage of the present methods and systems is that the solvents used vary in specific heat capacity and can also be employed as both heat transfer and precursor transfer media-yielding faster, more efficient heating of anodes. Precursors dissolved into solution are also much more stable with regards to air ambient exposure as compared to their pure analogs, yielding improved safety and easier handling.

Optionally, the anode may undergo a first rinsing/purge step, 102, whereby excess first reagent from step 100 is removed with a solvent. Here, most or all of the non-adsorbed first reagent will be removed from the anode surface before moving the electrode to the next process step. Key process variables include solvent temperature, anode temperature, and residence time. Step 102 is shown in FIG. 1 as a single step, however, in certain embodiments, this step may be repeated or may have additional rinsing/purging steps to improve first reagent removal.

The rinsing step may leave exactly one saturated (i.e., purified) first layer on the anode and a residual solution comprising the first solvent, unreacted first reagent(s) and other reaction byproducts in the reaction chamber.

As an additional optional step, to recover the solvent used in the rinsing step and any unreacted reagent, the residual solution may be passed to a filtration step, 103. The filtration step separates the solvent from the unreacted reagent (and any reaction byproduct). The filtration step also prevents cross-contamination between chambers and avoids slow contamination of rinse solutions with reagent over the course of operation. Continuous filtering of rinse baths can not only maintain purity of rinse solvent but can also act as a system for materials recovery, thereby boosting the materials utilization efficiency of the process. Any filtration techniques known in the art may be used. Preferred technologies include, but are not limited to, membrane separation, chemical precipitation, ion-exchange, electrochemical removal, physical adsorption, and flow filtration chromatography.

The separated solvent may be recycled back to the rinsing step, 102, for reuse. Likewise, the filtered unreacted first reagent(s) may also be recycled back to 104 for further use in the process (not shown).

A partially coated conversion anode, having a layer (i.e., a self-limiting layer comprising an adsorbed first reagent) may then be exposed, in 104, to a second liquid solution comprising a second reagent in a second reaction chamber.

In some embodiments, the second liquid solution may comprise an oxidizing agent, such as an oxide or chalcogenide source, examples of which include, but are not limited to, water, thioacetamide, and sodium sulfide. A solvent may also be present, which may comprise of polar or nonpolar organic solvents or may just be water. In other embodiments, the second liquid solution may also contain a nitrogen-containing reagent such as ammonia or hydrazine. In some embodiments, the second solution may also vary in pH.

The second reagent is of a different and distinct composition as compared to the first reagent. The second reagent is selected to be able to react with the adsorbed first reagent to produce a complete monolayer of thin film compound coated onto the conversion anode.

In some embodiments, the entire film may be formed by reagents exposed to the conversion anode from the first liquid solution alone. In this case, the second solution may be skipped entirely.

In some embodiments, the compound formed may comprise a metal oxide, such as $Al_2O_3$ and $TiO_2$. In other embodiments, the compound formed may comprise Transition Metal Dichalcogenides (TMDs). Typical examples of this class of materials follow the general chemical formula $MX_2$, where M is a transition metal such as Mo, W, Ti, etc., and X is either S or Se.

In some embodiments, the compound is composed of any combination of the following polymers: polyethylene oxide (PEO), poly vinyl alcohol (PVA), poly methyl methacrylate (PMMA), poly dimethyl siloxane (PDMS), poly vinyl pyrolidone (PVP). Such polymers, when combined with lithium salts such as $LiClO_4$, $LiPF_6$ or $LiNO_3$, among others, can yield a solid polymer electrolyte thin film.

In some embodiments, the compound may comprise, for example, a sulfide or selenide of Mo, Ti, or W. These materials vary widely in their electronic properties, such as bandgap, and thus can be used to create tailored semiconductor heterojunctions that will, for example, block electron transfer necessary for degrading reactions in lithium-ion battery operation. Specifically, such mechanisms can be exploited to block degrading reactions on anode surfaces.

In some embodiments, the compound formed may be selected from the group consisting of:
(a) binary oxides of type $A_xO_y$, where A is an alkali metal, alkali-earth metal, transition metal, semimetal or metalloid and x and y are stoichiometric coefficients;
(b) ternary oxides of type $A_xB_yO_z$, where A and B are any combination of alkali metal, alkali-earth metal, transition metal, semimetal or metalloid and x, y and z are stoichiometric coefficients;
(c) quaternary oxides of type $A_wB_xC_yO_z$, where A, B and C are any combination of alkali metal, alkali-earth metal, transition metal, semimetal or metalloid and w, x, y and z are stoichiometric coefficients;
(d) binary halides of type $A_xB_y$, where A is an alkali metal, alkali-earth metal, transition metal, semimetal or metalloid, B is a halogen and x and y are stoichiometric coefficients;
(e) ternary halides of type $A_xB_yC_z$, where A and B are any combination of alkali metal, alkali-earth metal, transition metal, semimetal or metalloid, C is a halogen and x, y and z are stoichiometric coefficients;
(f) quaternary halides of type $A_wB_xC_yD_z$, where A, B and C are any combination of alkali metal, alkali-earth metal, transition metal, semimetal or metalloid, D is a halogen and w, x, y and z are stoichiometric coefficients;
(g) binary nitrides of type $A_xN_y$, where A is an alkali metal, alkali-earth metal, transition metal, semimetal or metalloid and x and y are stoichiometric coefficients;
(h) ternary nitrides of type $A_xB_yN_z$, where A and B are any combination of alkali metal, alkali-earth metal, transition metal, semimetal or metalloid and x, y and z are stoichiometric coefficients;
(i) quaternary nitrides of type $A_wB_xC_yN_z$, where A, B and C are any combination of alkali metal, alkali-earth metal, transition metal, semimetal or metalloid and w, x, y and z are stoichiometric coefficients;
(j) binary chalcogenides of type $A_xB_y$, where A is an alkali metal, alkali-earth metal, transition metal, semimetal or metalloid, B is a chalcogen and x and y are stoichiometric coefficients;
(k) ternary chalcogenides of type $A_xB_yC_z$, where A and B are any combination of alkali metal, alkali-earth metal, transition metal, semimetal or metalloid, C is a chalcogen and x, y and z are stoichiometric coefficients;
(l) quaternary chalcogenides of type $A_wB_xC_yD_z$, where A, B and C are any combination of alkali metal, alkali-earth metal, transition metal, semimetal or metalloid, D is a chalcogen and w, x, y and z are stoichiometric coefficients;
(m) binary carbides of type $A_xC_y$, where A is an alkali metal, alkali-earth metal, transition metal, semimetal or metalloid and x and y are stoichiometric coefficients;
(n) binary oxyhalides of type $A_xB_yO_z$, where A is an alkali metal, alkali-earth metal, transition metal, semimetal or metalloid, B is a halogen and x, y and z are stoichiometric coefficients;
(o) binary arsenides of type $A_xAs_y$, where A is an alkali metal, alkali-earth metal, transition metal, semimetal or metalloid and x and y are stoichiometric coefficients;
(p) ternary arsenides of type $A_xB_yAs_z$, where A and B are any combination of alkali metal, alkali-earth metal, transition metal, semimetal or metalloid and x, y and z are stoichiometric coefficients;
(q) quaternary arsenides of type $A_wB_xC_yAs_z$, where A, B and C are any combination of alkali metal, alkali-earth metal, transition metal, semimetal or metalloid and w, x, y and z are stoichiometric coefficients;
(r) binary phosphates of type $A_x(PO_4)_y$, where A is an alkali metal, alkali-earth metal, transition metal, semimetal or metalloid and x and y are stoichiometric coefficients;
(s) ternary phosphates of type $A_xB_y(PO_4)_z$, where A and B are any combination of alkali metal, alkali-earth metal, transition metal, semimetal or metalloid and x, y and z are stoichiometric coefficients; and
(t) quaternary phosphates of type $A_wB_xC_y(PO_4)_z$, where A, B and C are any combination of alkali metal, alkali-earth metal, transition metal, semimetal or metalloid and w, x, y and z are stoichiometric coefficients.

In the case that the reaction is between a non-ionic precursor such as a metalorganic with an oxidizer, as in the hydrolysis of trimethylaluminum, organic moieties are removed and replaced with metal-oxygen-metal bonds, until all bonds are fully saturated. In the case that the reaction is between two ionic solutions, as in the reaction between solutions of $Cd^{2+}$ and $S^{2-}$ ions, the high solubility product constant of the reaction promotes precipitation of an ionic compound, in this case CdS, with the electrode promoting heterogeneous film formation by minimizing surface energy.

In some embodiments, the compound formed within the monolayer or stacked monolayers of thin films that form an artificial SEI may comprise at least one or more metalcones.

The one or more metalcones may be produced by a reaction between a first precursor selected from a metalorganic and a second precursor selected from an organic molecule. In some embodiments, the first precursor may be a metalorganic. The metalorganic may comprise an organic moiety and such metals that include, but are not limited to, Al, Zn, Si, Ti, Zr, Hf, Mn, and/or V. In some embodiments, the second precursor may be an organic molecule. In certain embodiments, the organic molecules may include, but not be limited to, ethylene glycol, glycerol, erythritol, xylitol, sorbitol, mannitol, butanediol, pentanediol, hydroquinone, hexanediol, lactic acid, triethanolamine, p-phenylenediamine, glycidol, caprolactone, fumaric acid, aminophenol, and/or diamino diphenyl ether.

In other embodiments, the compound formed within the monolayer or stacked monolayers of thin films that form an artificial SEI may comprise one or more organic material(s). Such organic material(s) may include but is not limited to polyamides, polyimides, polyureas, polyazomethines, and/or fluoroelastomers. In certain embodiments, the organic material(s) may be produced by a reaction between a first reagent comprising a first organic molecule and a second reagent comprising a second organic molecules. In certain embodiments, the first organic molecule is chemically distinct from the second organic molecule.

In certain embodiments, the thin film that forms an artificial SEI may have a thickness of about 0.5 nm to 100 µm. For example, the thin film may be a thickness within the range of 0.5 nm-10 nm, 10 nm-50 nm, 50 nm-100 nm, 100 nm-500 nm, 500 nm-1 µm, 1 µm-10 µm, 10 µm-50 µm, or 50 µm-100 µm.

In some embodiments, the thin film that form an artificial SEI may be characterized based on its strength and durability. Accordingly, the thin film generated by the monolayer or stacks of monolayers may have an elastic modulus of at most 100 GPa and at least 0.1 GPa. In other embodiments, the material comprising the thin film generated by the monolayer or stacks of monolayers may possess a bulk elongation at break of at most 500% and at least 1%.

Similar to step 102, the conversion anode from step 104 is then directed to a second rinsing/purge step, 106, to remove non-adsorbed/unreacted second reagent.

In some embodiments, steps 100 to 106 may be repeated any number of times until a desired thickness of thin film coating is formed onto the conversion anode. This scheme is indicated by 108, where the anode coated with the thin film is directed back to step 100 for further processing (forming a loop). In some embodiments, the steps will be repeated but with different precursors, thereby yielding coatings comprising of stacks of thin films comprising various compounds.

Additionally, during 102 and 106, the rinse or purge solvent may be either continuously or periodically filtered so that unreacted reagent(s) can be separated and recovered from solvent. This filtering step is indicated in steps 103 and 105, respectively. Both precursor and solvent can then be potentially recycled back into the process. Here, the recycling of the solvent is shown by the return arrows. These filtration steps will save significant material costs over the lifetime of the apparatus. For every wash and rinse step, a filtration step may be incorporated into the design. The filtration technique is preferably tuned to the types of reagents used in steps 100 and 104. For instance, an aqueous ionic solution may require the types of filtration columns used in deionizers to be adequately filtered. However, an organometallic may be better removed by a tangential flow filtration system that excludes by molecular weight, for instance.

Figure 2:
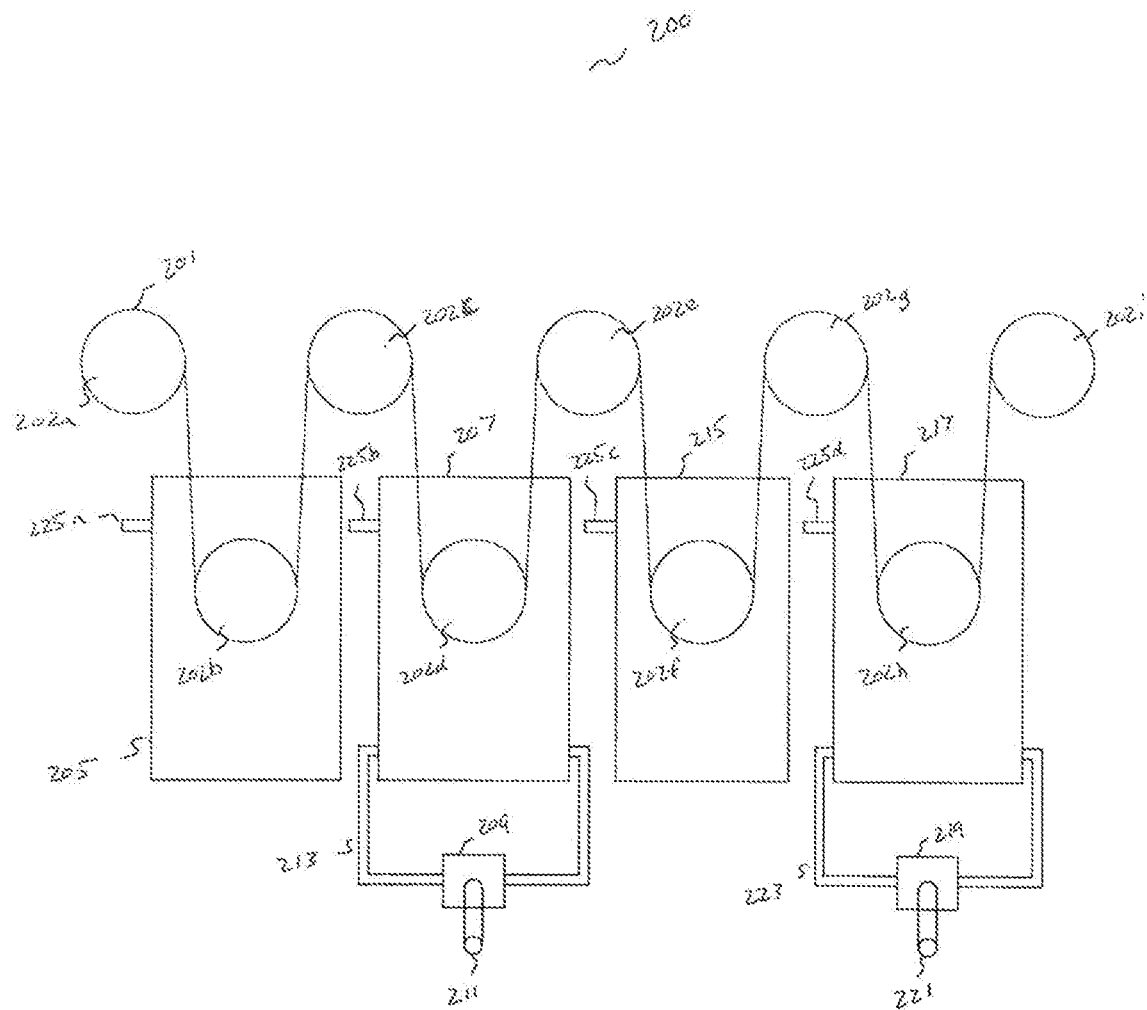
FIG. 2 is a schematic drawing of one embodiment of a system for coating a thin film onto the surface of a lithium-ion battery anode in accordance with the disclosure.

A schematic drawing of an embodiment of a system for coating a thin film that forms an artificial SEI onto the surface of a conversion anode is shown in FIG. 2. In FIG. 2, the reaction chambers are shown as sequential tanks or baths containing reaction solutions; the electrode is conveyed into the reaction chambers with the assistance of a conveying apparatus. While the embodiment of FIG. 2 is related to a method for coating a thin film that forms an artificial SEI onto the surface of a battery electrode, this description is only representative of a component to be coated using the methods and systems provided herein and is not to be construed as being limited in any way.

The conveying apparatus of FIG. 2 is particularly suited and adapted in such a way as to guide or direct the conversion anode, into and out of the first and second reaction chambers in a sequential manner.

The conveyance apparatus, which is preferably automated, comprises a series of rollers, such as tensioning rollers, positioned in such a manner as to guide or direct the electrode into and out of the first and second reaction chambers. In this way, the system can provide for a continuous liquid deposition process for coating a thin film that forms an artificial SEI onto the surface of an electrode. The series of rollers, 202*a-i*, are driven by a conveying motor (not shown). The rollers, 202*a-i*, are operated and oriented in such a way to enable a conversion anode, 201, to be conveyed through the system as discussed in greater detail below. The system, 200, also comprises a series of chambers, 205, 207, 215, and 217.

In certain embodiments, the first and second reaction chambers may include a sensor for determining or measuring the volume of first or second liquid solution that is in the respective reaction chamber or the concentration of precursor in each respective reaction chamber. Additionally, the first and second reaction chambers may also comprise a regulating valve that is electronically actuated by the sensor. When the sensor (such as a float switch) determines that the liquid solution is too low, the valve opens up, allowing more liquid solution from another source to flow into the reaction chamber. In some cases, a pump (such as a peristaltic pump) is used to drive the liquid solution into the reaction chamber. When the sensor determines that the liquid solution is at the desired level, the valve closes, preventing excess liquid solution from flowing into the reaction chamber. In some cases, if the sensor determines that the liquid solution is too high in the reaction chamber, the valve opens up, allowing the excess liquid to flow out of the reaction chamber. In the case that the sensor detects precursor concentration, a valve may expose the tank to a stock solution of high precursor concentration in the circumstance that the tank precursor solution is detected to be low, and vice-versa. An example of such a sensor is an ion-selective electrode.

In further embodiments, the system comprises a first rinsing chamber located between the first and second reaction chambers. The first rinsing chamber contains the first rinsing solution comprising the first solvent for rinsing the anode conveyed to the first rinsing chamber by the conveyance apparatus to produce a saturated first layer on the anode and a first residual solution comprising the first solvent and unreacted first reagent.

Likewise, the system may also comprise a second rinsing chamber located after the second reaction chamber. The second rinsing chamber contains a second rinsing solution comprising a second solvent for rinsing the electrode conveyed to the second rinsing chamber by the conveyance apparatus to produce a thin film that forms an artificial SEI coated onto the conversion anode.

Chamber 205 is a first reaction chamber that contains a first liquid solution comprising a first reagent and a solvent.

Chamber 207 is a first rinsing chamber located after the first reaction chamber, 205, contains a first rinsing solution comprising a first solvent. A first filtration apparatus, 209, is connected to the first rinsing chamber, 207. First filtration apparatus 209 has a residue tube, 213, that is connected to the first rinsing chamber, 207, and a permeate collection tube, 211.

Another chamber, 215, is a second reaction chamber located after the first rinsing chamber, 207, and contains a second liquid solution comprising a second reagent and a solvent.

Chamber 217 is a second rinsing chamber located after the second rinsing chamber, 215. Second rinsing chamber 217 contains a second rinsing solution comprising a solvent. A second filtration apparatus, 219, is connected to the second rinsing chamber, 217. Second filtration apparatus 219 has a residue tube, 223, that is connected to the second rinsing chamber, 217, and a permeate collection tube, 221.

System 200 further comprises valves 225a-d located on each of the chambers, 205, 207, 215, and 217, respectively. The valves, 225a-d, are connected to a replenishing source (not shown), which provide, when needed, additional first liquid solution, second liquid solution, first reagent, second reagent, or solvent, as in the case for first and second chambers 215 and 215, respectively, or more first rinsing solution or second rinsing solution, as in the case of first and second rinsing chambers, 207 and 217, respectively. Valves 225a-d may be electrically-actuated and opened by the triggering of a sensor (not shown), which is adapted to monitor or measure the volume or concentration of liquid solution in a chamber. The sensors may be dipped into the liquid solution of each chamber.

In operation, a first portion of an electrode, 203, is first placed on a first roller, 202a, which is part of conveying apparatus 201. Typically, the first portion is attached, such as by glue or tape, to a leader material that is strung through the rest of rollers 202b-i. In this way, the leader material can guide the electrode through the conveying apparatus, 201, during the process. The leader material may then be removed from the electrode once the portion of the electrode that was placed on roller 202a is conveyed to roller 202i or when coating of the entire electrode is completed. An example of such a leader material may be from a previous roll of electrode. In advance of the coating of a specific electrode, the previous roll of electrode e may have had a long trailing length with no active material (just foil). Once the previous roll has been processed, this remnant is left strung on the conveying apparatus, and the active material can be slit and removed. The remnant will then act as a leader to guide the next roll of electrode through the conveying apparatus.

Accordingly, the first portion of the electrode, 203, is conveyed into first reaction chamber 205 by movement of second roller 202b, which is also located within first reaction chamber 205. First portion of electrode 203 is exposed within first reaction chamber 205 to a first liquid solution to produce a self-limiting layer comprising an adsorbed first reagent on the surface of the first portion of the electrode. The first portion of electrode, 203, is left in first reaction chamber 205 for a certain residence time in order for the reaction to take place. Once the reaction is substantially completed, the first portion of electrode 203 is withdrawn from first reaction chamber 205 by moving upward to third roller 202c.

While this is occurring, a second portion of electrode 203 is conveyed into first reaction chamber 205. Conveying apparatus operates in a continuous manner until the desired amount of electrode is coated with a thin film that forms an artificial SEI.

Returning back to the first portion of electrode 203, the first portion is then conveyed to a first rinsing chamber, 207 by movement of fourth roller 202d, which is also located within first rinsing chamber 207. The first rinsing chamber, 207, contains a first rinsing solution comprising a first solvent for rinsing the electrode 203 to produce a saturated first layer on the electrode and a first residual solution comprising the first solvent and unreacted first reagent.

The system may also comprise a filtration apparatus for separating unreacted reagent from the solvent in the first and second rinsing solutions. The filtration apparatus may be any device that can perform such a separation. Preferably, the filtration apparatus is selected from one of the following: a membrane, a filtration column, or a chromatographic column, a chemical or electrochemical separation tank, or an adsorption column.

When needed, the first rinsing solution is passed to first filtration apparatus 209 to separate the unreacted first reagent from the first solvent. The first filtration apparatus, 209, produces a permeate stream enriched in unreacted first reagent and depleted in first solvent and a residue stream enriched in first solvent and depleted in unreacted first reagent compared to the first rinsing solution. The permeate stream is collected in permeate collection tube 211, which may be recycled or sent back to the first reaction chamber, 205. The residue stream is recycled back to the first rinsing chamber, 207, via residue tubing 213. Filtration apparatus, 209, may operate periodically or continuously. From the first rinsing chamber 207, the first portion of electrode 203 is then withdrawn from first rinsing chamber 207 by moving upward to fifth roller 202e.

First portion of electrode 203 is then conveyed into second reaction chamber 215, by moving downward to sixth roller 202f, which is also located within second reaction chamber 215. Second reaction chamber 215 comprises a second liquid solution comprising at least a second reagent. Within second reaction chamber 215, the electrode, 203, is exposed to the second liquid solution, which reacts with the first adsorbed reagent to produce a monolayer of thin film coated onto the surface of the electrode. After the reaction is substantially completed, the first portion of electrode 203 is then withdrawn from second reaction chamber 215 by moving upward to seventh roller 202g.

Next, first portion of electrode 203 is conveyed to a second rinsing chamber, 217, by moving downward to eighth roller 202h, which is also located within second rinsing chamber 217. The second rinsing chamber, 217, contains a second rinsing solution comprising a second solvent for rinsing the electrode to produce a purified monolayer of thin film coated onto the surface of the anode, 203, and a second residual solution comprising the second solvent and unreacted second reagent.

Similar to the first rinsing solution, the second rinsing solution may be sent to a second filtration apparatus, 219. Second filtration apparatus 219 produces a permeate stream enriched in unreacted second reagent and depleted in second solvent and a residue stream enriched in second solvent and depleted in unreacted second reagent compared to the second rinsing solution. The permeate stream is collected in permeate collection tube 221, which may be recycled or sent back to the second reaction chamber, 215. The residue stream is recycled back to the second rinsing chamber, 217, via residue tubing 223. Filtration apparatus, 219, may operate periodically or continuously.

Finally, a first portion of anode 203 is withdrawn from second rinsing chamber 217 being conveyed up to ninth roller 202*i*. From here, the first portion may be collected or rolled up until the rest of the desired portions of the anode are coated with a thin film that forms an artificial SEI.

A similar embodiment of the present disclosure to that described in FIG. 2 can involve replacement of bath-deposition reaction chambers 205 and 215 with slot-die or gravure coating reaction chambers (not shown). In such an embodiment, rinse chambers 207 and 217 may or may not be present, depending on the need for a rinse step. In such an embodiment or even in the embodiment described in FIG. 2, an excess solution removal technique such as an air knife, doctor blade, metering knife or similar can be employed in lieu of a rinse step. In another embodiment, 215 may be entirely absent, as the entire deposition reaction may be performed in 205. As such, the apparatus of the present disclosure, both in terms of deposition equipment and conveying equipment, can be considered to be modular and assembled in any specific manner so as to facilitate a specific solution-deposition process.

Methods of the present disclosure can be implemented using, or with the aid of, computer systems. The computer system can be involved in many different aspects of the operation the present methods, including but not limited to, the regulation of various aspects of the conveyance apparatus, such as by directing movement of the conveyance apparatus by moving the component to be coated into and out of the reaction chambers; by controlling the timing of the opening and closing of valves; detecting the volume of liquid via sensor readings, directing the flow of liquids, such as reagents and buffers, into the reaction chambers; and regulating pumps. In some aspects, the computer system is implemented to automate the methods and systems disclosed herein.

The computer system may include a central processing unit (CPU, also "processor" and "computer processor" herein), which can be a single core or multi core processor, or a plurality of processors for parallel processing. The computer system may also include memory or memory location (e.g., random-access memory, read-only memory, flash memory), electronic storage unit (e.g., hard disk), communication interface (e.g., network adapter) for communicating with one or more other systems, and peripheral devices, such as cache, other memory, data storage and/or electronic display adapters. The memory, storage unit, interface and peripheral devices are in communication with the CPU through a communication bus (solid lines), such as a motherboard. The storage unit can be a data storage unit (or data repository) for storing data. The computer system can be operatively coupled to a computer network ("network") with the aid of the communication interface. The network can be the Internet, an internet and/or extranet, or an intranet and/or extranet that is in communication with the Internet. The network in some cases is a telecommunication and/or data network. The network can include one or more computer servers, which can enable distributed computing, such as cloud computing. The network, in some cases with the aid of the computer system, can implement a peer-to-peer network, which may enable devices coupled to the computer system to behave as a client or a server.

The CPU can execute a sequence of machine-readable instructions, which can be embodied in a program or software. The instructions may be stored in a memory location, such as the memory. Examples of operations performed by the CPU can include fetch, decode, execute, and writeback.

The storage unit can store files, such as drivers, libraries and saved programs. The storage unit can store programs generated by users and recorded sessions, as well as output(s) associated with the programs. The storage unit can store user data, e.g., user preferences and user programs. The computer system in some cases can include one or more additional data storage units that are external to the computer system, such as located on a remote server that is in communication with the computer system through an intranet or the Internet The computer system can communicate with one or more remote computer systems through the network. For instance, the computer system can communicate with a remote computer system of a user (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system via the network.

Methods as described herein can be implemented by way of machine (e.g., computer processor) executable code stored on an electronic storage location of the computer system, such as, for example, on the memory or electronic storage unit. The machine executable or machine readable code can be provided in the form of software. During use, the code can be executed by the processor. In some cases, the code can be retrieved from the storage unit and stored on the memory for ready access by the processor. In some situations, the electronic storage unit can be precluded, and machine-executable instructions are stored on memory.

The code can be pre-compiled and configured for use with a machine have a processer adapted to execute the code, or can be compiled during runtime. The code can be supplied in a programming language that can be selected to enable the code to execute in a precompiled or as-compiled fashion.

Aspects of the systems and methods provided herein, such as the computer system, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution. Hence, a machine-readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system can include or be in communication with an electronic display that comprises a user interface (UI) for providing, for example, one or more results of sample analysis. Examples of UFs include, without limitation, a graphical user interface (GUI) and web-based user interface.

The methods and systems provided above are now further described by the following examples, which are intended to be illustrative, but are not intended to limit the scope or underlying principles in any way.

EXAMPLES

Example 1

Coating Thin Films on Si-Containing Anodes

Aspects of the present disclosure describe replacing the naturally formed SEI on bare Si-containing anodes with an "artificial SEI" layer by depositing a novel conformal thin-film coating directly and throughout the microstructure of formed electrodes using a solution-phase process. The method combines the silicon-graphite composite anode material and a conductive or insulating binder material with a thin-film solution-deposited coating. The specific materials used as solution-phase deposited coatings are described further herein.

In this example, active materials within the silicon-graphite composite anode are bound with inorganic or polymer binders that are themselves either electrically conductive or electrically insulating.

In this example, the Si-graphite composite active material is composed of 50% silicon and 50% graphite. The Si-graphite composite anode is generated through the casting of a slurry comprising the aforementioned active material, a conductive or insulating adhesive binder such as PPy or PVDF, respectively, an additional conductive additive such as conductive carbon, and an appropriate suspending solvent. The slurry is cast onto a foil current collector made from a metal such as Cu, After the solvent from the cast slurry is evaporated, the resulting active material composite anode film may be calendered to a final porosity of 10-50% and a thickness between 10 and 100 microns.

In this example, four specific candidate materials may then be used as coatings on the calendered Si-graphite composite anode: AlGL (Aluminum/Glycerol Alucone), AlHQ (Aluminum/Hydroquinone Alucone), AlXY (Aluminum/Xylitol Alucone), Aromatic Polyamide (Kevlar™-type).

The first two materials, AlGL and AlHQ, are chosen specifically because of their previously demonstrated efficacy as an artificial SEI in composite Si-graphite electrodes when applied by vapor-phase MLD. Transferring the deposition of these materials to solution-phase represents a relatively low-risk pathway to the demonstration of the viability of solution-phase coating processes in protecting Si anode surfaces.

The last two materials, AlXY and aromatic polyamide, represent exciting new examples of coatings that are currently not feasible or difficult to deposit via vapor-phase techniques. Xylitol is the five-carbon sugar alcohol analogue to glycerol. It has a near-zero vapor pressure up to 200° C., rendering its use in vapor-phase MLD impossible. However, xylitol can be appreciably dissolved in various polar solvents, which means it can be employed in a solution-phase MLD process. The reason for the use of xylitol is that its five-carbon chain (and five associated hydroxyl groups) will greatly enhance the branching of its corresponding alucone. This enhanced branching is then expected to improve the alucone's fracture toughness and impermeability to solvents. The same improvement in mechanical properties with increasing branching can be observed when comparing AlEG to AlGL. The fully saturated carbon network in AlXY can also promote good electronic resistivity. Finally, the high level of branching can also yield a substantial mass gain per cycle, which may eventually lead to a lower number of deposition cycles required to result in a total film thickness approaching 5 nm.

Aromatic polyamides have been known for decades for their exceptional fracture toughness. As one of the most fracture-resistant polymers known, Kevlar™-type poly-paraphenylene terephthalamide (PPTA) is expected to withstand the volumetric expansion of an underlying silicon anode. Additionally, recent studies of grafted polymers onto flat Si substrates have shown dramatic improvement in capacity retention. However, grafting formed polymers onto surfaces in a calendered, porous electrode is difficult due to the poor diffusion of large polymers through tortuous pathways. For this reason, MLD is preferred to grow polymers from smaller monomers or oligomers that are less likely to face such mass transport issues.

The deposition of PPTA via vapor-phase MLD from the homobifunctional reagents terephthaloyl chloride (TC) and p-phenylenediamine (PDA) has been attempted, however, this process demonstrated an irregular growth rate, which may be due to the "double reaction" of TC with adjacent amine sites, resulting in reaction termination. In contrast, unique chemistries can be employed in solution-phase to ensure that only one functional group per molecule will react per cycle, which will improve the controlled MLD growth.

An example of a specific composition of a Si-graphite composite anode to be coated via solution-phase MLD with one or more of the aforementioned four candidate coating materials will have the rough composition of 44% Hitachi MagE™ graphite, 44% 50-70 nm nano/amorphous Si, 2% "C45" carbon conductive additive and a 10% mixture of conductive binders.

At 50% active material Si content, this electrode formulation is expected to possess a gravimetric capacity of approximately 1600 mAh/g. An example of a reasonable cathode to pair with such an anode is a ~60 micron thick NMC532 cathode with ~150 mAh/g 1C capacity. To then generate a matching anode with approximately 1.3:1 anode: cathode capacity ratio, the aforementioned Si-graphite composite anode will need to be scaled to an appropriate thickness. At 1600 mAh/g and an assumed calendared porosity of ~40%, this anode would be ~18-20 microns thick.

For full lithium-ion batteries constructed with the aforementioned anode and cathode pairing, a separator such as Celgard 2325 may be used and an electrolyte such as 1.2M $LiPF_6$ in 3:7 EC:EMC may be used.

An example of a cycling protocol for the aforementioned constructed lithium-ion batteries includes cycling between full cell potentials of 3 and 4.1V at charge or discharge rates between C/10 and 5C.

Thickness targets for all candidate coating materials on electrodes in the context of this example is 5 nm. In contrast to processes developed for coating of flat Si wafers, residence times of precursors may need to be lengthened to encourage precursor diffusion throughout an anode's tortuous morphology. However, such residence times are unlikely to exceed 10 seconds.

A portion of each coated anode may be retained and potted in conductive epoxy and polished for cross-section analysis by SEM-EDX. EDX elemental analysis for Al in the alucones will help demonstrate penetration of the coating material. Small sections of the electrode may be microtomed and harvested for TEM analysis. TEM provides a better understanding of the uniformity and conformality of coatings on individual particles. Here as well, EDX can be utilized to perform elemental analysis. Entire sections of electrode can also be digested into acid and studied via ICP; elemental analysis of Al, for instance, in ICP solutions is expected to scale as a function of thickness and conformality of alucone coating.

Coating process parameters may be tuned to improve coating quality and uniformity, or other techniques such as electrode surface pre-treatment can be employed such as plasma or ozone pre-treatments to improve liquid film wetting or final film adhesion. Some cells may also be cycled under an "aggressive" cycling protocol of 2.7-4.2V at 1C It should be understood from the foregoing that, while particular implementations have been illustrated and described, various modifications can be made thereto and are contemplated herein. It is also not intended that the present disclosure be limited by the specific examples provided within the specification. While certain embodiments have been described with reference to the aforementioned specification, the descriptions and illustrations of the preferable embodiments herein are not meant to be construed in a limiting sense. Furthermore, it shall be understood that all aspects of the present disclosure are not limited to the specific depictions, configurations or relative proportions set forth herein which depend upon a variety of conditions and variables. Various modifications in form and detail of the embodiments will be apparent to a person skilled in the art.

It is therefore contemplated that the present disclosure shall also cover any such modifications, variations and equivalents.

What is claimed is:

1. A liquid phase deposition method for generating an artificial solid-electrolyte interphase (SEI) on a surface of a fully-formed lithium-ion battery anode composed of at least a conversion material, comprising:
   (a) transferring, by a conveyance apparatus, the fully-formed lithium-ion battery anode to a first reaction chamber containing a first liquid solution comprising at least a first reagent;
   (b) exposing, by the conveyance apparatus, the fully-formed lithium-ion battery anode to the first liquid solution in the first reaction chamber to yield a partially-coated layer of the artificial SEI with at least the first reagent chemically bonded onto the surface of the fully-formed lithium-ion battery anode;
   (c) rinsing, in the first reaction chamber, the partially-coated layer of the artificial SEI with a first rinsing solution comprising a first solvent to remove unreacted first reagent;
   (d) transferring, by the conveyance apparatus, the fully-formed lithium-ion battery anode from (c) to a second reaction chamber containing a second liquid solution comprising at least a second reagent;
   (e) exposing, by the conveyance apparatus, the fully-formed lithium-ion battery anode to the second liquid solution in the second reaction chamber, wherein at least the second reagent reacts with at least the first reagent chemically bonded onto the surface of the fully-formed lithium-ion battery anode to produce the artificial SEI comprising a monolayer on the surface of the fully-formed lithium-ion battery anode, the monolayer comprising at least one or more metalcones generated from a reaction of at least the second reagent and the first reagent; and
   (f) rinsing, in the second reaction chamber, the artificial SEI with a second rinsing solution comprising a second solvent to remove unreacted second reagent.

2. The method of claim 1, wherein steps (a)-(f) are repeated to yield consecutive growth of multiple stacked monolayers, thereby yielding an artificial SEI having an overall thickness between 0.5 nanometers (nm) and 100 micrometers (μm).

3. The method of claim 1, wherein the fully-formed lithium-ion battery anode in step (a) has a thickness of 100 nm to 1,000 μm, has pores ranging in size of 0.1 nm to 100 μm, and has a film porosity of 1-99%.

4. The method of claim 1, wherein the conversion material comprises Si, Sn, Ge, Al, P, Zn, Ga, As, Cd, In, Sb, Pb, Bi, SiO, $SnO_2$, or any combinations of these.

5. The method of claim 1, wherein the at least one or more metalcones are generated by a reaction between a first reagent comprising a metalorganic and a second reagent comprising an organic molecule.

6. The method of claim 5, wherein the first reagent is a metalorganic comprising an organic moiety and a metal comprising at least one of Al, Zn, Si, Ti, Zr, Hf, Mn, or V, and the second reagent is an organic molecule comprising ethylene glycol, glycerol, erythritol, xylitol, sorbitol, mannitol, butanediol, pentanediol, hydroquinone, hexanediol, lactic acid, triethanolamine, p-phenylenediamine, glycidol, caprolactone, fumaric acid, aminophenol, and/or diamino diphenyl ether.

7. The method of claim 1, wherein the conveyance apparatus comprises a series of rollers for transferring in (a)

and (d) the fully-formed lithium-ion battery anode to the first reaction chamber or the second reaction chamber.

8. The method of claim 1, wherein the fully-formed lithium-ion battery anode of (b) and (e) are exposed to the first liquid solution and the second liquid solution by submerging, spraying, slot die coating, bath coating, or gravure roller coating.

9. The method of claim 1, wherein the fully-formed lithium-ion battery anode comprises an active material, wherein the active material is exposed to the first liquid solution and the second liquid solution by spraying, slot die coating, bath coating, or gravure roller coating.

10. The method of claim 1, further comprising:
passing a first residual solution comprising the first solvent and unreacted first reagent to a first filtration step to separate unreacted first reagent from the first solvent;
passing a second residual solution comprising the second solvent and unreacted second reagent to a second filtration step to separate the unreacted second reagent from the second solvent;
recycling recovered unreacted first reagent or recovered unreacted second reagent back to the first liquid solution or the second liquid solution; and
recycling recovered first solvent or recovered second solvent back to the first rinsing solution or the second rinsing solution.

11. The method of claim 10, wherein the first filtration step and the second filtration step are carried out using membrane separation, chemical precipitation, ion-exchange, electrochemical removal, physical adsorption, flow filtration chromatography, or any combination of these.

12. The method of claim 1, wherein the first liquid solution and the second liquid solution comprise more than one reagent.

13. The method of claim 1, wherein the artificial SEI is composed of grains having a size ranging from 0.5 nm to 100 μm in length, the artificial SEI possesses an elastic modulus between 0.1 GPa and 100 GPa, and the artificial SEI possesses a bulk elongation at break between 1% and 500%.

14. The method of claim 1, wherein the artificial SEI is crystalline.

15. The method of claim 1, wherein the artificial SEI is amorphous.

16. A liquid phase deposition method for generating an artificial solid-electrolyte interphase (SEI) on a surface of a fully-formed lithium-ion battery anode composed of at least a conversion material, comprising:
(a) transferring, by a conveyance apparatus, the fully-formed lithium-ion battery anode to a first reaction chamber containing a first liquid solution comprising at least a first reagent;
(b) exposing, by the conveyance apparatus, the fully-formed lithium-ion battery anode to the first liquid solution in the first reaction chamber to yield a partially-coated layer of the artificial SEI with at least the first reagent chemically bonded onto the surface of the fully-formed lithium-ion battery anode;
(c) rinsing, in the first reaction chamber, the partially-coated layer of the artificial SEI with a first rinsing solution comprising a first solvent to remove unreacted first reagent;
(d) transferring, by the conveyance apparatus, the fully-formed lithium-ion battery anode from (c) to a second reaction chamber containing a second liquid solution comprising at least a second reagent;
(e) exposing, by the conveyance apparatus, the fully-formed lithium-ion battery anode to the second liquid solution in the second reaction chamber, wherein at least the second reagent reacts with at least the first reagent chemically bonded onto the surface of the fully-formed lithium-ion battery anode to produce the artificial SEI comprising a monolayer on the surface of the fully-formed lithium-ion battery anode, the monolayer comprising one or more organic materials generated from a reaction of at least the second reagent and the first reagent; and
(f) rinsing, in the second reaction chamber, the artificial SEI with a second rinsing solution comprising a second solvent to remove unreacted second reagent.

17. The method of claim 16, wherein the one or more organic materials include a polymer comprising a polyamide, polyimide, polyurea, polyazomethine, a fluoroelastomer, or any combination of these.

18. The method of claim 16, further comprising:
passing a first residual solution comprising the first solvent and the unreacted first reagent to a first filtration step to separate the unreacted first reagent from the first solvent;
passing a second residual solution comprising the second solvent and the unreacted second reagent to a second filtration step to separate the unreacted second reagent from the second solvent;
recycling recovered unreacted first reagent or recovered unreacted second reagent back to the first liquid solution or the second liquid solution; and
recycling recovered first solvent or second solvent back to the first rinsing solution or the second rinsing solution.

19. A liquid phase deposition method for generating an artificial solid-electrolyte interphase (SEI) on a surface of a fully-formed lithium-ion battery anode composed of at least a conversion material, comprising:
(a) transferring, by a conveyance apparatus, the fully-formed lithium-ion battery anode to a first reaction chamber containing a first liquid solution comprising at least a first reagent;
(b) exposing, by the conveyance apparatus, the fully-formed lithium-ion battery anode to the first liquid solution in the first reaction chamber to yield a partially-coated layer of the artificial SEI with at least the first reagent chemically bonded onto the surface of the fully-formed lithium-ion battery anode;
(c) rinsing, in the first reaction chamber, the partially-coated layer of the artificial SEI with a first rinsing solution comprising a first solvent to remove unreacted first reagent;
(d) transferring, by the conveyance apparatus, the fully-formed lithium-ion battery anode from (c) to a second reaction chamber containing a second liquid solution comprising at least a second reagent;
(e) exposing, by the conveyance apparatus, the fully-formed lithium-ion battery anode to the second liquid solution in the second reaction chamber, wherein at least the second reagent reacts with at least the first reagent chemically bonded onto the surface of the fully-formed lithium-ion battery anode to produce the artificial SEI comprising a monolayer on the surface of the fully-formed lithium-ion battery anode, the monolayer generated from a reaction of at least the second reagent and at least the first reagent and the artificial SEI is composed of grains having a size ranging from 0.5 nm to 100 μm in length, the artificial SEI possesses an elastic modulus between 0.1 GPa and 100 GPa, and the artificial SEI possesses a bulk elongation at break between 1% and 500%; and (f) rinsing, in the second reaction chamber, the artificial SEI with a second rinsing solution comprising a second solvent to remove unreacted second reagent.

20. The method of claim 19, further comprising:

passing a first residual solution comprising the first solvent and the unreacted first reagent to a first filtration step to separate the unreacted first reagent from the first solvent;

passing a second residual solution comprising the second solvent and the unreacted second reagent to a second filtration step to separate the unreacted second reagent from the second solvent;

recycling recovered unreacted first or recovered unreacted second reagent back to the first liquid solution or the second liquid solution; and recycling recovered first solvent or recovered second solvent back to the first rinsing solution or the second rinsing solution.

* * * * *